United States Patent [19]

Garnweidner et al.

[11] Patent Number: 5,056,861
[45] Date of Patent: Oct. 15, 1991

[54] IMPACT GIRDER FOR THE SIDE OF AN AUTOMOTIVE VEHICLE

[75] Inventors: Peter Garnweidner, Lamprechtshausen; Peter Üblacker, Bürmoos, both of Austria

[73] Assignee: Austria Metall Aktiengesellschaft, Braunau am Inn, Austria

[21] Appl. No.: 521,719

[22] Filed: Apr. 23, 1990

[51] Int. Cl.⁵ .............................................. B60R 27/00
[52] U.S. Cl. .................................. 296/188; 296/146; 188/371; 49/502
[58] Field of Search ................... 296/188, 189, 146; 49/502; 52/731, 232; 188/371, 376, 377

[56] References Cited

U.S. PATENT DOCUMENTS

| | | | |
|---|---|---|---|
| 3,829,149 | 8/1974 | Stevens | 296/189 |
| 4,684,166 | 8/1987 | Kanodia | 296/188 X |
| 4,702,515 | 10/1987 | Kato et al. | 296/189 |
| 4,838,606 | 6/1989 | Furubayashi et al. | 296/188 |
| 4,919,473 | 4/1990 | Laimighofer et al. | 296/189 X |
| 4,948,196 | 8/1990 | Baba et al. | 296/188 |

FOREIGN PATENT DOCUMENTS

| | | | |
|---|---|---|---|
| 274985 | 7/1988 | European Pat. Off. | 296/188 |
| 1480089 | 8/1969 | Fed. Rep. of Germany | 49/502 |
| 3606024 | 8/1987 | Fed. Rep. of Germany | 296/188 |

Primary Examiner—Margaret A. Focarino
Assistant Examiner—Joseph D. Pape
Attorney, Agent, or Firm—Herbert Dubno; Yuri Kateschov

[57] ABSTRACT

An impact girder for a door or side wall of a passenger vehicle which has a hollow space extending along the length of a beam having compression and tension flanges. In the region between a central zone and the ends of the beam, the compression flange is formed with a pair of slots providing control deformation of the beam upon application of a force to the central region.

10 Claims, 3 Drawing Sheets

IMPACT GIRDER FOR THE SIDE OF AN AUTOMOTIVE VEHICLE

FIELD OF THE INVENTION

The present invention relates to an impact girder for the door or side wall of an automotive vehicle and, more particularly, to a girder having controlled rupture and designed to take up the energy of impact in the event of a lateral collision with the vehicle. The girder can be provided in a door frame as a structural element or reinforcement thereof, in a side wall of the vehicle, or in the door of the vehicle itself.

BACKGROUND OF THE INVENTION

To provide better protection against injury to the occupants of a motor vehicle, generally an automobile, in cases of lateral collisions, it is known to provide a girder or beam which can have any of a number of cross sectional shapes, e.g. a tubular, I-profile or some other structural shape, as a reinforcement or stiffening element in the doors and/or side walls of the vehicle. Attention may be directed in this regard to U.S. Pat. No. 4,915,442 which issued 10 Apr. 1990.

Such girders are fastened on door frame parts or the vehicle body beams of the vehicle and brace the thin outer sheet metal elements against impact-type loads applied from the exterior.

In the case of an accident, especially a lateral collision, the girder deforms inwardly together with the outer sheet metal element and transfers the force of the collision to the structural elements of the body and the chassis, i.e. the body structure or the door frame.

To fulfill modern-date safety standards, at the beginning of deformation the strength of the girder and its resistance to impact should approximate the load carrying capacity of the door frame or the structural elements upon which the girder is mounted. The greater the resistance to deformation initially, the greater will be the deformation work which is transferred to and taken up by the structural elements carrying the girder and, therefore, the vehicle body.

During the deformation, however, it is not advantageous to allow the resistance to deformation to increase except to a slight extent, to ensure that the support or frame parts carrying the girder will not become overloaded and subjected to massive deformation.

It is thus important to be able to provide a control deformation of such a girder and especially a deformation which will prevent overloading of the parts of the vehicle body supporting same.

OBJECTS OF THE INVENTION

It is, therefore, the principal object of the present invention to provide an improved impact girder which responds more effectively to a lateral impact of a vehicle and can be used in the side wall or in a door of the vehicle, such that disadvantages of earlier systems can be obviated.

Another object of the invention is to provide an improved girder which can reinforce a door or side wall of the vehicle and, in addition, has a particularly effective controlled deformation preventing overloading of the structure upon which the girder is supported.

SUMMARY OF THE INVENTION

These objects and others which will become apparent hereinafter are attained, in accordance with the invention by providing a girder for the purposes described which has its compression flange in the region between a central region along the length of the girder and the ends thereof each with a longitudinally extending elongated recess which is parallel to the longitudinal dimension or axis of the girder.

More particularly, the girder of the invention for protecting a side of a passenger compartment of an automotive vehicle against a collision from that side comprises a longitudinally extending beam having opposite ends secured to a body of the vehicle, the beam having a compression flange facing outwardly from the compartment, a tension flange facing inwardly toward the compartment and at least one elongated hollow space extending within the beam between the flanges, the compression flange being formed with at least one elongated opening communicating with the hollow space between a central region of the girder and at least one of the ends, the elongated opening extending parallel to a longitudinal dimension of the beam.

These recesses may be slots and serve to reduce the stiffness of the girder which is contributed largely by the webs which bridge the compression and tension flanges and normally would be highly resistant to deformation. In spite of the fact that the webs generally lie parallel to the impact direction and the direction in which the force of impact is applied to the girder, and thus would normally be expected to be able to withstand high forces since these are applied edge-on, the provision of the slots causes, at relatively low stresses in the region of the slots, a distortion of the girder allowing the webs to bend out of the aforementioned planes. The webs can bend to one side or another of their original planes when an impact is communicated to the girder even though the stresses in the slotted region are less than those developed at the central region. Because of the elongated nature of the slots, the deformability of the girder remains constant over a comparatively long displacement of the girder under the impact. Because the webs are deformed out of their respective planes, the resistance to further displacement rapidly falls off, thereby ensuring that the support structures for the girder will not be overloaded and the impact girder will not be prematurely torn away from its supports. Unlike earlier impact girders or side wall reinforcements for automotive vehicles which increase resistance to deformation once an impact has occurred, the system of the invention allows a sharp drop in the resistance to deformation once there has been a slight deflection of the webs out of their original planes.

In the above-identified patent is has been pointed out that a girder can be provided with holes to weaken the wall strength and thus reduce the strength of the girder as a whole. However, the resistance to deformation remains limited and the flow of the girder during deformation occurs in the regions of the reduced cross section brought about by the holes.

With the girder of the invention, however, there is no flow under high stresses in the cross section between slits or openings, but rather a buckling of the webs because of the presence of the slots.

In the region in which the profile of the girder is closed, namely, in the central zone of the girder a coupling is effected between the two webs which can ensure a relatively high antibuckling strength while nevertheless guaranteeing that buckling will occur where necessary in use to avoid breakdown of the support, for example. In the central region, the girder has its maximum strength and greatest resistance to deformation, defining the resistance to initial deformation. In the slotted zones flanking this central zone the buckling resistance of the webs and not the stress applied determines the deformation which results.

Preferably, the slots lie along a common longitudinal axis of the flange and are disposed oppositely on opposite sides of the central zone. This can ensure a uniform deformation of the girder and can prevent twisting during the deformation. It has been found to be advantageous to form the hollow beam with two webs bridging the compression and tension flanges and thus providing a rectangular cross section to the beam. The longitudinal axis or axes of the slots in section is arranged so that it extends through the main inertial axis running through the compression flange and the compression flange itself. This construction is especially simple and can ensure a twist free deformation even of a girder which is shaped to conform to the outer configuration of the vehicle.

According to a feature of the invention, the slots have a collective length of one-third to two-thirds of the total length of the beam and preferably a collective length of 0.4 to 0.6 times the length of the beam. The slots can be of equal length and disposed symmetrically on opposite sides of the central region which can have a length parallel to the slots of 0.05 to 0.15 times the total length. The compression flange can be cut away in regions of the ends and the beam can be formed at the aforementioned junctions with projecting lips in planes of the flanges.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 1:
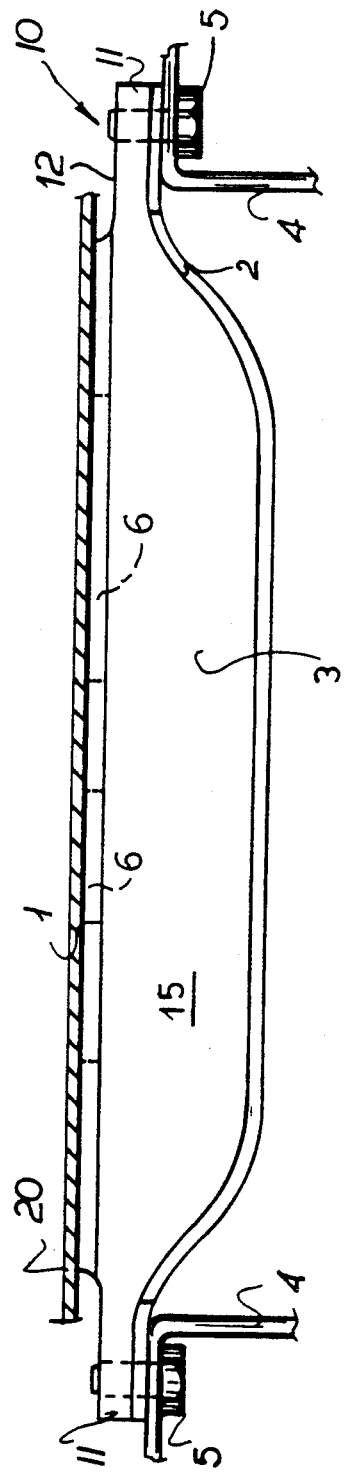
FIG. 1 is a top plan view of an impact girder incorporated in a door of an automotive vehicle according to the invention.

In FIG. 1 the exterior side of an automotive vehicle is shown to be formed by a sheet metal skin 20 which is braced by an impact girder 10. The latter comprises a beam 12 which is mounted at its ends 11 on a door frame of the vehicle body whose members are shown at 4. The mounting is here effected by bolts 5 and nuts 13.

The beam 12 has a compression flange 1 which is cut away at its ends, and a tension flange 2 extending opposite the compression flange 1 but over the full length of the beam. The flanges are bridged by webs 3 which normally lie in mutually parallel planar relationship without weakening. The webs 3 and the flanges 1, define a hollow space 15 extending to the end regions of the girder where the compression flange 1 is cut away.

However, it is also possible to provide holes or the like along a neutral zone of the webs 3 to reduce the weight of the girder.

Figure 5:
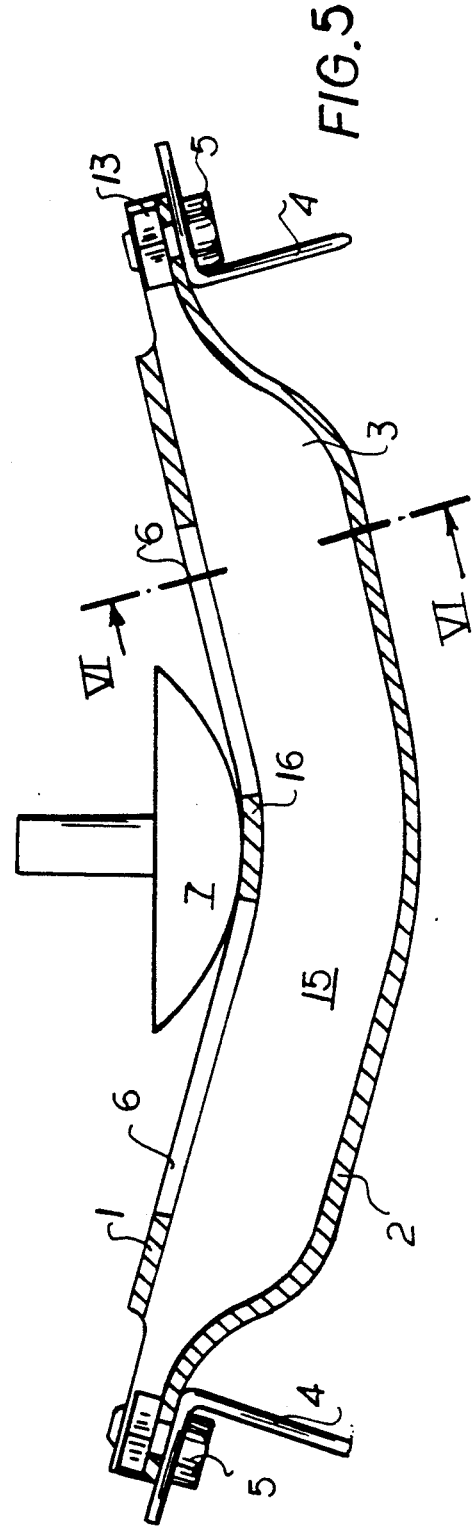
FIG. 5 shows the girder in longitudinal section and under stress as in a test bench.

As can be seen from FIG. 5, upon the application of a lateral force, represented here by a test plunger 7, a load concentrated upon the central zone 16 defined between slots and which has no slot 6, will result in a deformation of the girder.

Figure 2:
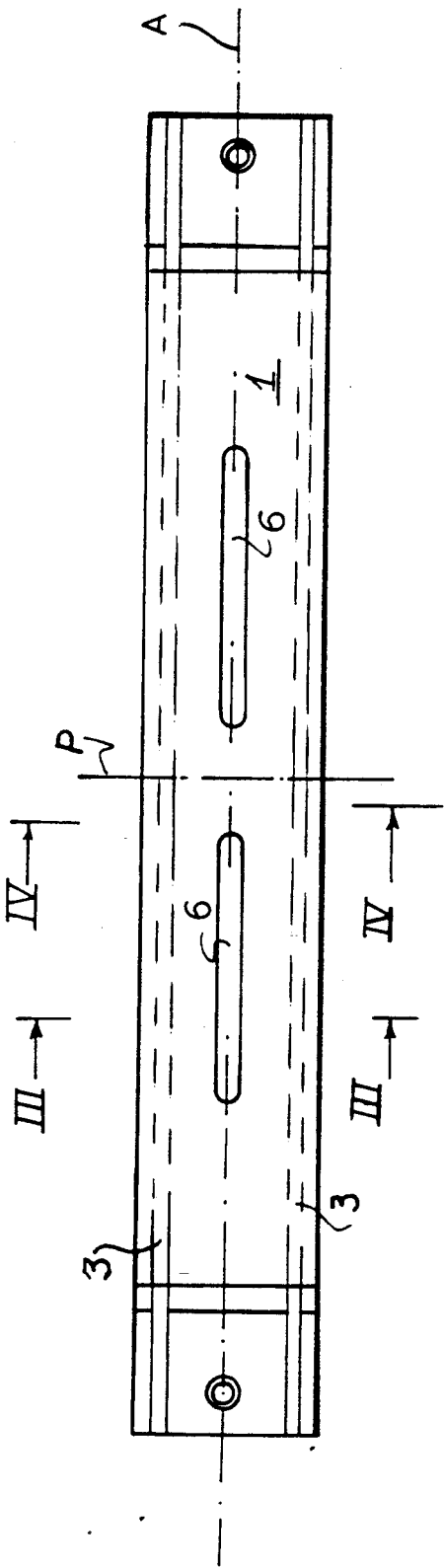
FIG. 2 is an elevational view from the compression flange side of the girder of FIG. 1.
Figure 3:
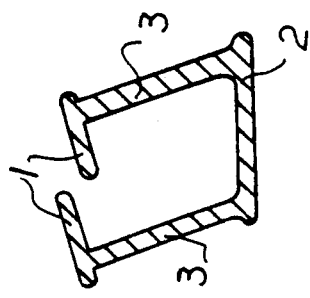
FIG. 3 is a sectional view along the line III—III of FIG. 2.
Figure 4:
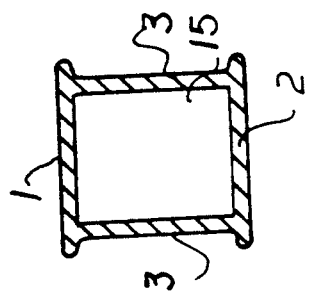
FIG. 4 is a section along the line IV—IV of FIG. 2.
Figure 6:
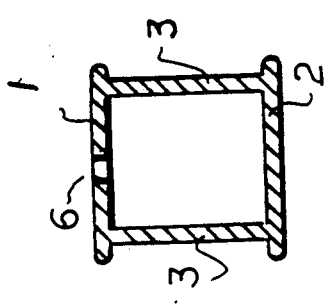
FIG. 6 is a deformed cross section along the line VI—VI of FIG. 5.

The compression flange 1, however, has two slots 6 which extend parallel to one another with a common longitudinal axis A of the flange and lies symmetrically on opposite sides of the symmetry plane P (FIG. 2) of the central region. The collective length of slots is approximately of one-third to two-third of the total length of the flange. However, it's possible to achieve the same results by using the collective length of 0.4–0.6 of the total length. Preferably slots have an equal length. The central region is about 0.05 to 0.15 of the total length. These slots, having the dimensions described above and a width measured transversely to the longitudinal dimension of 0.1 to 0.3 times the distance between the webs 3 can be formed in the compression flange so as to extend through the thickness thereof. The thickness of the compression flange may be substantially equal to the slot width. As a result, upon deformation as shown in FIG. 5, there is a substantially uniform distortion of the webs 3 out of their original planes and a buckling to either side of the central region 16, thereby absorbing the energy of impact.

Figure 7:
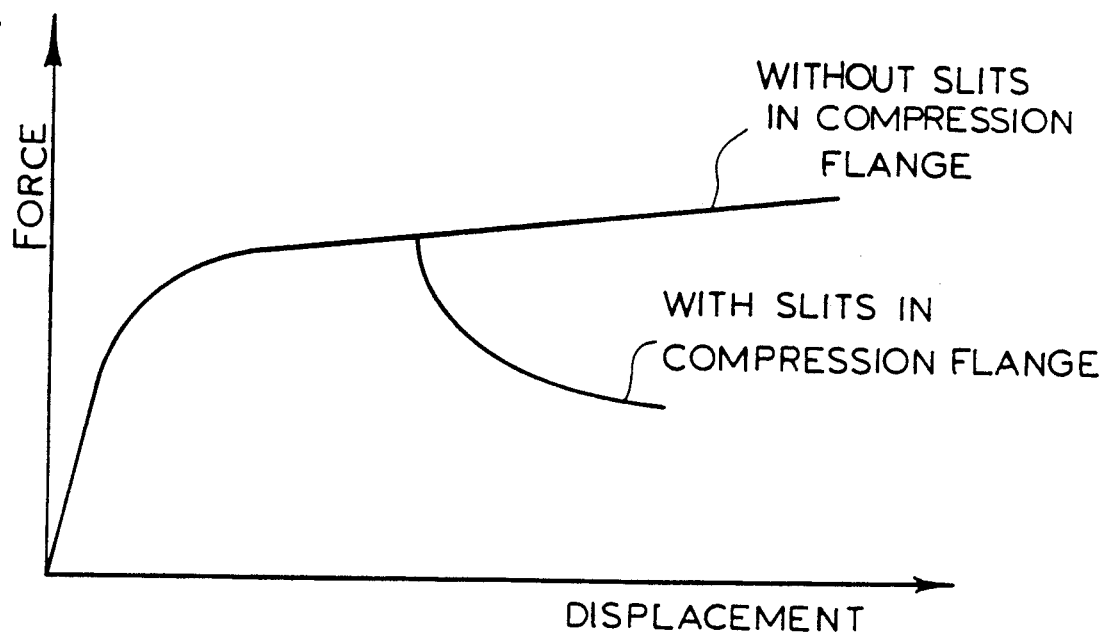
FIG. 7 is a force/displacement diagram comparing an impact girder of the invention with an impact girder which does not have the slots of the girder of the invention.

The illustrated embodiment is, of course, only one possibility. The girder can be introduced into the door frame or can be mounted via bent over ends in some other way along the side of the vehicle. As is apparent from FIG. 7 where force is plotted along the abscissa verses displacement along the ordinate, after an initial period of rapid force rise and minimum displacement, the girder without slits 6 continues to deform uniformly and practically linearly with increasing force application. The girder having the slits, however, at the point at which the buckling of the webs 3 commences, shows a sudden and rapid breakdown under the applied force, thereby absorbing the impact energy without a danger that the girder will tear loose.

We claim:

1. An impact girder for protecting a side of a passenger compartment of an automotive vehicle against a collision from that side, said impact girder comprising a longitudinally extending beam having opposite ends secured to a body of the vehicle, said beam having a compression flange facing outwardly from said compartment and being formed with a longitudinal flange axis lying in a central plane thereof, said compression flange being formed with a continuous slotless central region between ends of said compression flange and between opposite longitudinal edges thereof, said central region having a symmetry plane perpendicular to said central plane of said compression flange, a tension flange facing inwardly toward said compartment, and at least one elongated hollow space extending within said beam between said flanges, said compression flange being formed with first and second linearly extending elongated slot-like openings spaced axially apart in said central plane on opposite sides of said central plane and each communicating with said hollow space between the central region of said flange and a respective one of said ends, each of said elongated openings having a pair of longitudinal parallel edges extending parallel to said longitudinal edges of said compression flange and lying symmetrically on opposite sides of said symmetry plane defining therebetween said central slotless region, said slot-like opening weakening said compressing flange to permit deformation thereof to displace the longitudinal edges of said opening out of a plane of the compression flange upon an impact from the outside of said compartment, said central region having a width along said central plane which is less than the lengths of said slot-like openings therealong.

2. The impact girder defined in claim 1 wherein said beam is of generally rectangular cross section and said hollow space is defined between a pair of mutually parallel webs bridging between said flanges.

3. The impact girder defined in claim 2 wherein said slots have longitudinal axes which are provided in a section through the main inertial axis running through the compression flange.

4. The impact girder defined in claim 2 wherein said slots have a collective length of one-third to two-thirds of the total length of said beam.

5. The impact girder defined in claim 4 wherein said slots have a collective length of 0.4 to 0.6 times said total length.

6. The impact girder defined in claim 5 wherein said slots are of equal length.

7. The impact girder defined in claim 6 wherein said central region has a length parallel to said slots of 0.05 to 0.15 times said total length.

8. The impact girder defined in claim 7 wherein said compression flange is cut away in regions of said ends.

9. The impact girder defined in claim 8 wherein said beam is formed with outwardly projecting lips at junctions of said webs with said flanges and in planes of said flanges.

10. The impact girder defined in claim 9 wherein said beam is incorporated in a door of said vehicle and is in contact with an outer sheet metal element of said door.

* * * * *